United States Patent
Uchida et al.

(10) Patent No.: US 11,249,675 B2
(45) Date of Patent: Feb. 15, 2022

(54) INFORMATION MANAGEMENT SYSTEM

(71) Applicant: Honda Motor Co., Ltd., Tokyo (JP)

(72) Inventors: Tsubasa Uchida, Wako (JP); Yuki Morita, Tokyo (JP); Satoshi Onodera, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/065,009

(22) Filed: Oct. 7, 2020

(65) Prior Publication Data

US 2021/0124523 A1    Apr. 29, 2021

(30) Foreign Application Priority Data

Oct. 28, 2019  (JP) .............................. JP2019-194892
Oct. 28, 2019  (JP) .............................. JP2019-194893

(51) Int. Cl.
*G06F 3/06* (2006.01)
*H04L 9/32* (2006.01)

(52) U.S. Cl.
CPC .......... *G06F 3/0655* (2013.01); *G06F 3/0604* (2013.01); *G06F 3/0676* (2013.01); *H04L 9/32* (2013.01)

(58) Field of Classification Search
CPC ............................................. H04L 41/046–048
See application file for complete search history.

(56) References Cited

U.S. PATENT DOCUMENTS

| | | | |
|---|---|---|---|
| 10,521,780 B1* | 12/2019 | Hopkins, III | G06Q 20/12 |
| 10,535,207 B1* | 1/2020 | Goluguri | G07C 5/0841 |
| 2016/0021178 A1* | 1/2016 | Liu | H04L 41/06 370/216 |
| 2017/0046792 A1* | 2/2017 | Haldenby | H04L 9/3247 |
| 2018/0091596 A1* | 3/2018 | Alvarez | H04L 9/3239 |
| 2019/0007484 A1* | 1/2019 | Chen | H04W 4/40 |
| 2020/0034550 A1* | 1/2020 | Kim | H04L 9/0861 |
| 2021/0091927 A1* | 3/2021 | MacNeille | H04L 9/3239 |

FOREIGN PATENT DOCUMENTS

JP    2019066950 A    4/2019

OTHER PUBLICATIONS

M. Singh and S. Kim, "Introduce reward-based intelligent vehicles communication using blockchain," 2017 International SoC Design Conference (ISOCC), 2017, pp. 15-16, doi: 10.1109/ISOCC.2017. 8368806. (Year: 2017).*

* cited by examiner

*Primary Examiner* — Khoa D Doan
(74) *Attorney, Agent, or Firm* — Duft & Bornsen, PC

(57) ABSTRACT

An information management system, in which each of a plurality of vehicles is configured to record information using a block chain. Each of the plurality of vehicles includes: a communication unit including an antenna and configured to be connectable to an internet through the antenna; a storage unit configured to store the information in a form of the block chain; and a processor and a memory coupled to the processor. The processor is configured to perform: recording the information in the storage unit.

20 Claims, 4 Drawing Sheets

INFORMATION MANAGEMENT SYSTEM

CROSS-REFERENCE TO RELATED APPLICATION

This application is based upon and claims the benefit of priority from Japanese Patent Applications No. 2019-194892 and No. 2019-194893 filed on Oct. 28, 2019, the content of which is incorporated herein by reference.

BACKGROUND OF THE INVENTION

Field of the Invention

This invention relates to an information management system.

Description of the Related Art

Conventionally, information management system for managing information acquired from vehicles has been known. Japanese Patent Application Laid-Open No. 2019-066950 (JP2019-066950A) discloses a system in which a server device acquires various types of information of a vehicle from an in-vehicle device mounted on the vehicle and grasps a usage state of the vehicle.

The system described above, since the server device is configured as a centralized system for managing data, it is difficult to suppress unauthorized rewriting of information.

SUMMARY OF THE INVENTION

An aspect of the present invention is an information management system, in which each of a plurality of vehicles is configured to record information using a block chain. Each of the plurality of vehicles includes: a communication unit including an antenna and configured to be connectable to an internet through the antenna; a storage unit configured to store the information in a form of the block chain; and a processor and a memory coupled to the processor. The processor is configured to perform: recording the information in the storage unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

First Embodiment

Hereinafter, a first embodiment of the present invention will be described with reference to FIGS. 1 to 3.

Figure 1:
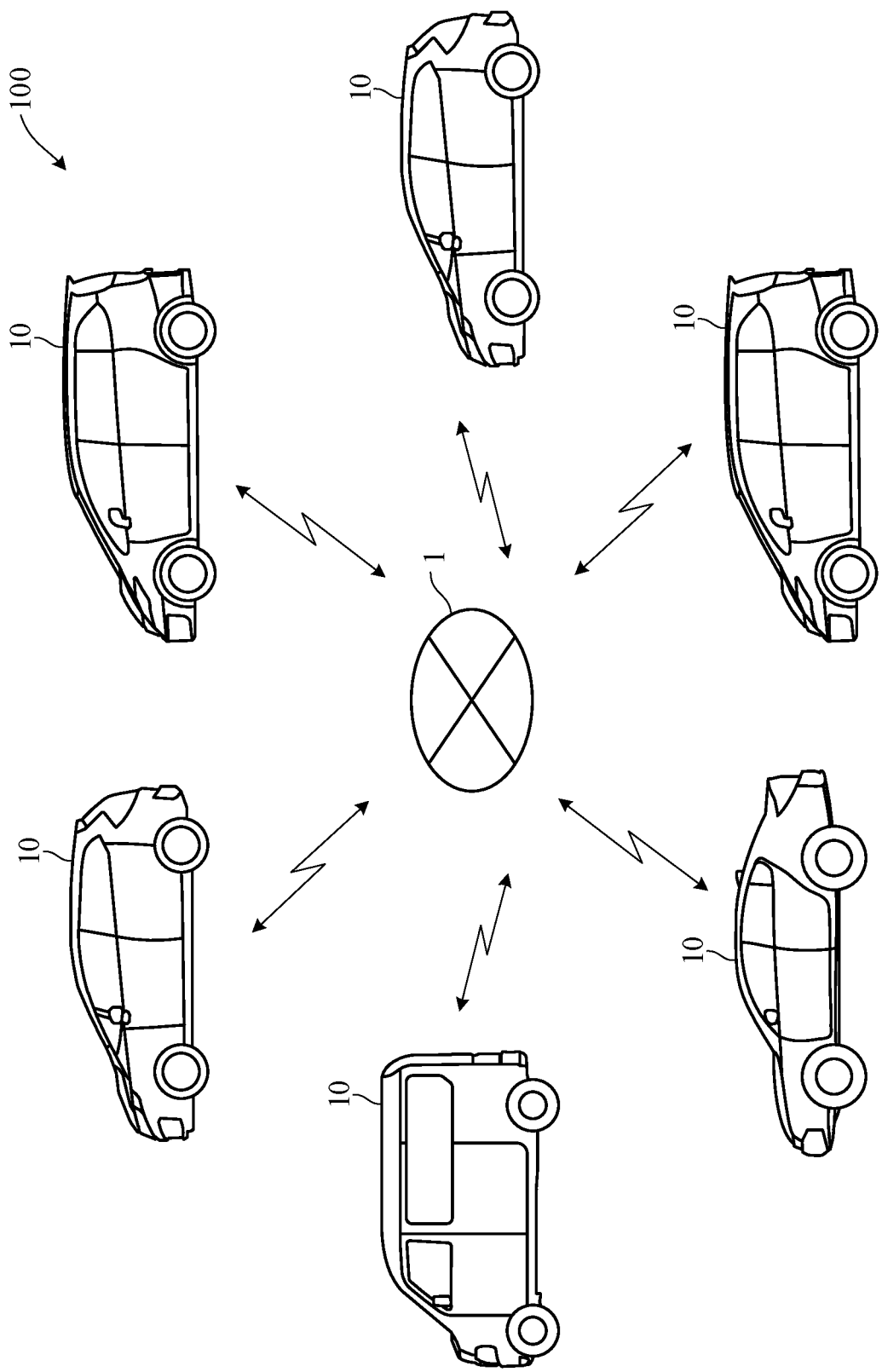
FIG. 1 is a diagram schematically showing overall configuration of an information management system according to a first embodiment of the present invention.

FIG. 1 is a diagram schematically showing a configuration of an information management system 100 according to the first embodiment of the present invention. The information management system 100 is a system in which each of vehicles 10 records and manages information such as transactions executed between vehicles using a block chain. The information management system 100 according to the first embodiment records and manages transactions executed between vehicles as the information.

The vehicle 10 is preferably pre-utilization registered to utilize this information management system 100. That is, each registered vehicle 10 records transactions executed between vehicles.

Figure 2:
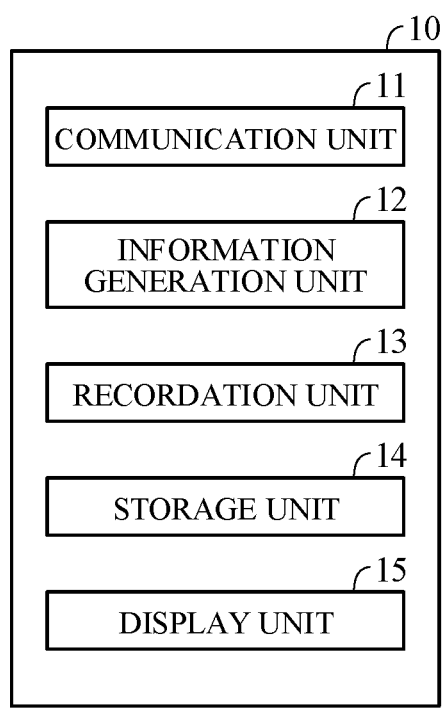
FIG. 2 is a block diagram showing configuration of a vehicle according to the first embodiment.

FIG. 2 is a block diagram showing the configuration of the vehicle 10. The vehicle 10 includes a communication unit 11, an information generation unit 12, a recordation unit 13, and a storage unit 14. As shown in FIG. 2, the vehicle 10 preferably further includes a display unit 15.

The communication unit 11 includes an antenna and is configured to be connectable to the internet 1 through the antenna. Connecting the communication unit 11 to the internet 1 enables recording of transactions executed between other vehicles. The communication unit 11 is connected to the internet 1 so that transactions can be executed between the user's own vehicle 10 and other vehicles 10. There are no particular restrictions on the content of the transaction, and for example, information relating to the transfer of money, traffic information, and the like can be cited.

The information generation unit 12 generates information to be recorded in the storage unit 14 in a form of a block chain.

Figure 3:
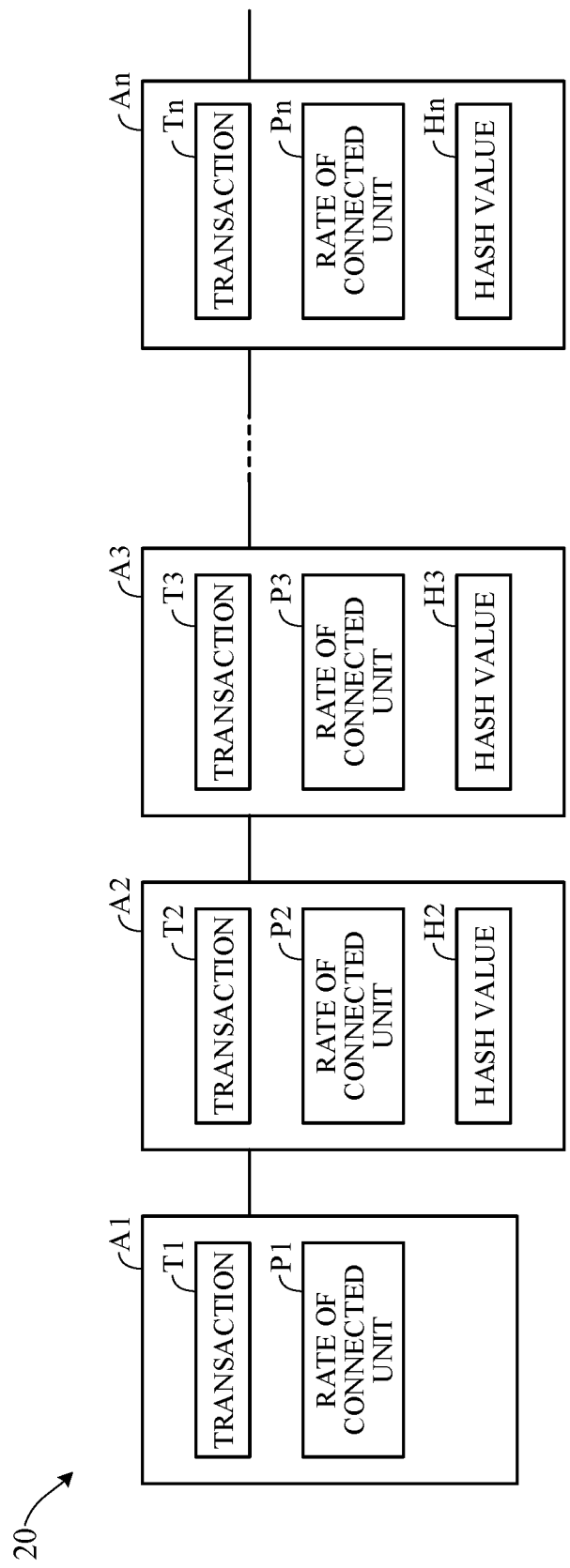
FIG. 3 is a diagram explaining information recorded in a storage unit in a form of a block chain according to the first embodiment.

FIG. 3 is a diagram for explaining data recorded in the storage unit 14 in a form of a block chain 20. The block chain 20 consists of a plurality of blocks $A_n$ (n=1, 2, 3 ... ), respectively, including a transaction $T_n$ (n=1, 2, 3 ... ) executed between the vehicles 10, information $P_n$ (n=1, 2, 3 ... ) indicating the rate of the communication unit 11 of the vehicle 10 connected to the internet 1 when the transaction $T_n$ is executed, and a hash value $H_n$ (n=1, 2, 3 ... ) generated from the content of the previous block $A_{n-1}$. However, in the blocks $A_1, A_2, A_3$ ... constituting the block chain 20, the first block $A_1$ does not include hash value Hi because the previous block does not exist. Each block $A_1, A_2, A_3$ ... may contain additional information, such as the timestamp when blocks are generated.

The information generation unit 12 generates the above-mentioned information included in the blocks constituting the block chain 20. Information on the transaction $T_n$ executed between other vehicles 10 is acquired via the internet 1, for example. Information $P_n$ indicating the rate of the communication unit 11 connected to the internet 1 when the transactional $T_n$ is executed is acquired via the internet 1, for example. Hash value $H_n$ is generated, for example, by encrypting the content of the previous block $A_{n-1}$ using a hashing function.

The recordation unit 13 records, in block units, the information generated by the information generation unit 12, i.e., the transaction $T_n$ executed between the vehicles 10, the information $P_n$ that indicates the rate of the communication unit 11 connected to the internet 1 when the transaction $T_n$ is executed among the communication units 11 of the vehicles 10, and hash value $H_n$, in the storage unit 14. However, in the information generated by the information generation unit 12, it is determined whether or not a preset agreement rule is satisfied in the vehicles 10, and only the information determined to satisfy the agreement rule is stored in the storage unit 14. The agreement rule is, for example, Proof Of Work.

Here, when a new transaction $T_n$ is executed between the vehicles 10, the new transaction $T_n$ is recorded in the storage unit 14 only when the communication unit 11 is connected to the internet 1, along with information $P_n$ indicating the rate of the communication unit 11 connected to the internet 1 described above and hash value $H_n$.

When a new transaction $T_n$ is requested to be executed between the vehicles 10, the recordation unit 13 does not record the transaction $T_n$ in the storage unit 14 as a completed transaction if the rate of the communication unit 11 connected to the internet 1 among the communication units 11 of the vehicles 10 is less than or equal to a predetermined rate. That is, when a new transaction $T_n$ is requested to be executed between the vehicles 10, the recordation unit 13 retains the transaction $T_n$ as an incompleted transaction when the rate of the communication unit 11 connected to the internet 1 among the communication units 11 of the vehicles 10 is less than or equal to the predetermined rate.

The communication unit 11 acquires the rate of the communication unit 11 connected to the internet 1 among the communication units 11 of the vehicles 10 at predetermined time intervals. The recordation unit 13 records the retained incompleted transaction in the storage unit 14 as the latest completed transaction $T_n$ if the rate of the communication unit 11 connected to the internet 1 acquired by the communication unit 11 exceeds the predetermined rate while retaining the incompleted transaction described above.

Here, the predetermined rate can be set according to the rate of the communication unit 11 connected to the internet 1 within a predetermined time period or in a predetermined time zone. For example, the average value of the rate of the communication unit 11 connected to the internet 1 within a predetermined time, such as between 1:00 µm and 2:00 µm, is calculated, and the calculated average value is set as the predetermined rate. In addition, the average value or the median value of the rate of the communication unit 11 connected to the internet 1 during the last one hour may be obtained, and a value lower than the obtained average value or the median value may be set as the predetermined rate. By setting the predetermined rate in accordance with the rate of the communication unit 11 connected to the internet 1 within a predetermined time period or in a predetermined time zone, it is possible to set appropriate values in accordance with the state of the rate of the communication unit 11 connected to the internet 1.

In the information management system 100 according to the first embodiment, not only the completed transaction $T_n$ executed between the vehicles 10 but also the incompleted transaction is recorded in the form of a block chain. That is, the recordation unit 13 records the incompleted transactions and hash values retained by each of the vehicles 10 in the storage unit 14 in units of blocks.

The display unit 15 is the vehicle 10 user-viewable display that displays information of the transactional $T_n$. When the transaction $T_n$ instructed to be executed by the user becomes an incompleted transaction, the display unit 15 displays the information when the transaction $T_n$ is assumed to have completed. That is, even if the transaction $T_n$ instructed to be executed by the user becomes an incompleted transaction, the user is notified by displaying the information on the display unit 15 assuming that the transaction $T_n$ has completed. Thus, the user can confirm the information of the transaction $T_n$ that instructed to be executed.

Incidentally, the information generation unit 12 and the recordation unit 13 can be configured by a CPU (processor), respectively. In other words, the CPU performs functions as the information generation unit 12 and the recordation unit 13. The storage unit 14 can be configured by, for example, hard disk drives.

Here, the authenticity of the transaction $T_n$ stored in the n-th block $A_n$ can be confirmed as follows. That is, confirm whether the hash value generated based on the content of the block $A_n$ including the transaction $T_n$ matches the hash value $H_{n+1}$ included in the following block $A_{n+1}$ of the block $A_n$. When two hash values are matched, the transaction $T_n$ stored in the n-th block $A_n$ is determined to be correct.

Thus, in the information management system 100 according to the first embodiment, since each of the vehicles 10 records the transaction $T_n$ executed between the vehicles 10 in the form of a block chain, it is possible to suppress unauthorized rewriting. Even if a third party illegally rewrites the transaction $T_n$ recorded in the storage unit 14, the hash value generated based on the information of block $A_n$ including the transaction $T_n$ rewritten illegally does not match the hash value $H_{n+1}$ included in the following block $A_{n+1}$ of the block $A_n$.

In addition, when the hash value $H_{n+1}$ included in the (n+1)-th block $A_{n+1}$ as well as the transaction $T_n$ included in the n-th block $A_n$ is rewritten illegally, the hash value generated based on the content of the block $A_{n+1}$ including the illegally rewritten hash value $H_{n+1}$ does not match the hash value $H_{n+2}$ included in the following block $A_{n+2}$ of the block $A_{n+1}$.

In other words, in order for a third party to illegally rewrite the transaction $T_n$ recorded in the storage unit 14, the information of all blocks $A_1$, $A_2$, $A_3$ . . . that make up the block chain 20 must be rewritten. Alternatively, at least all blocks $A_n$, $A_{n+1}$, $A_{n+2}$ . . . after the block $A_n$ including the transactional $T_n$ must be rewritten. Therefore, it is virtually impossible.

The recordation unit 13 is configured to record the transaction $T_n$, information $P_n$ indicating the rate of the communication unit 11 connected to the internet 1 when the transaction $T_n$ is executed among the communication units 11 of the vehicles 10, and the hash value $H_n$, in block units in the storage unit 14, when recording the new transaction $T_n$ in the storage unit 14. Since the hash value $H_n$ is generated based on the content of the previous block $A_{n-1}$, the information $P_{n-1}$ indicating the rate of the communication unit 11 included in the previous block $A_{n-1}$ is also used to generate the hash value $H_n$. Thus, it is possible to generate a more reliable hash value $H_n$, it is possible to more effectively suppress unauthorized rewriting.

Further, the recordation unit 13 can suspend the execution of a transaction $T_n$ that is considered unreliable because, when the execution of a new transaction $T_n$ is requested between the vehicle, the transaction $T_n$ is not recorded in the storage unit 14 as the completed transaction $T_n$ when the rate of the communication unit 11 connected to the internet 1 among the communication units 11 of the vehicles 10 is equal to or less than the predetermined rate. For example, if a third party attempts to execute an unauthorized transaction in a time zone where the rate of the communication unit 11 connected to the internet 1 is likely to be less than or equal to the predetermined rate, such a transaction is retained as an incompleted transaction, thus effectively suppressing unauthorized rewriting.

The recordation unit 13 also records the incompleted transaction in the storage unit 14 as the latest completed transaction $T_n$ when retaining the incompleted transaction and the rate of the communication unit 11 connected to the internet 1 acquired by the communication unit 11 exceeds the predetermined rate. Although incompleted transactions include some non-fraudulent transactions, such transactions can be recorded in the storage unit 14 in a reliable environment where the rate of the communication unit 11 connected to the internet 1 is higher than the predetermined rate.

Second Embodiment

Hereinafter, a second embodiment of the present invention will be described with reference to FIG. 4. In the second embodiment, block chain includes a first block chain and a second block chain.

Figure 4:
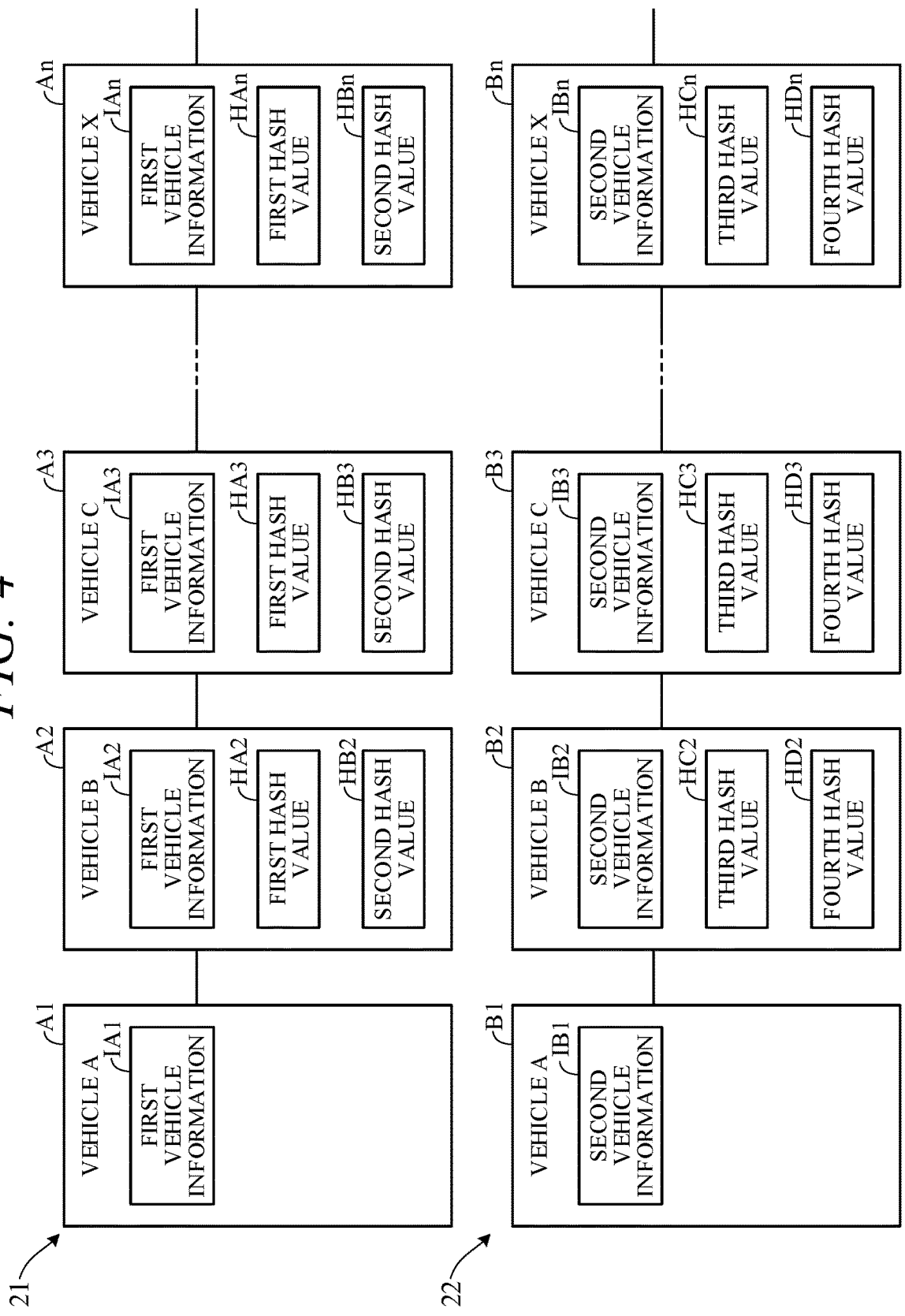
FIG. 4 is a diagram explaining configuration of a first block chain and a second block chain according to a second embodiment of the present invention.

FIG. 4 is a diagram for explaining a configuration of a first block chain 21 and a second block chain 22 in the second embodiment of the present invention.

The first block chain 21 is composed of a plurality of first-blocks $A_n$ (n=1, 2, 3 . . . ) including first-information $IA_n$ (n=1, 2, 3 . . . ). The second block chain 22 is composed of a plurality of second-blocks $B_n$ (n=1, 2, 3 . . . ) including second-information $IB_n$ (n=1, 2, 3 . . . ) that differs from the first-information $IA_n$.

For example, one of the first-information $IA_n$ and the second-information $IB_n$ is information about the user's vehicle type and the other is information about the user's vehicle area. In the second embodiment, the first-information $IA_n$ included in the first-block $A_n$ is information about the vehicle type, and the second-information $IB_n$ included in the second-block $B_n$ is information about the area. That is, in the information management system 100 according to the second embodiment, as the information, the information about the vehicle type is recorded and managed in the form of the first block chain 21 so as to be included in the first-block $A_n$, and the information about the area is recorded and managed in the form of the second block chain 22 so as to be included in the second-block $B_n$.

Here, the information about the vehicle type is information related to the model name of the vehicle, such as "Odyssey", "CR-V", and the like. The information about the area is information related to the area in which the vehicle is registered, and is, for example, a state name.

Each of the first-block $A_1, A_2, A_3$ . . . constituting the first block chain 21 is associated with or corresponds to one of the second-block $B_1, B_2, B_3$ . . . constituting the second block chain 22, respectively. Conversely, each of the second-block $B_1, B_2, B_3$ . . . is associated with or corresponds to one of the first-block $A_1, A_2, A_3$ . . . , respectively.

In the second embodiment, the n-th first-block $A_n$ of the first block chain 21 corresponds to the n-th second-block $B_n$ of the second block chain 22, respectively, such as the first first-block $A_1$ of the first block chain 21 corresponds to the first second-block $B_1$ of the second block chain 22, and the second first-block $A_2$ of the first block chain 21 corresponds to the second second-block $B_2$ of the second block chain 22. That is, the first-information $IA_n$ included in the n-th first-block $A_n$ of the first block chain 21 and the second-information $IB_n$ included in the n-th second-block $B_n$ of the second block chain 22 are information about the same vehicle.

The first-block $A_n$ includes a first-information $IA_n$, a first hash value $HA_n$ generated from the content of the previous first-block $A_{n-1}$, and a second hash value $HB_n$ generated from the content of the previous second-block $B_{n-1}$ of the second-block $B_n$ corresponding to the first-block $A_n$. However, in the first-blocks $A_1, A_2, A_3$ . . . constituting the first block chain 21, the first first-block $A_1$ does not include the first hash value $HA_1$ and the second hash value $HB_1$ because the previous block does not exist.

The information generation unit 12 generates the information included in the first-block $A_n$, that is, the first-information $IA_n$, the first hash value $HA_n$, and the second hash value $HB_n$. The first-information $IA_n$, i.e., the information about the vehicle type here, is registered in the vehicle 10, for example, when the vehicle is sold, and the registered information is acquired. The first hash value $HA_n$ is generated, for example, by encrypting the content of the previous first-block $A_{n-1}$ using a hashing function. The second hash value $HB_n$ is also generated, for example, by encrypting the content of the previous second-block $B_{n-1}$ of the second-block $B_n$ corresponding to the first-block $A_n$ using a hashing function.

Here, the first-block $A_n$ may further include other information, such as a time stamp when the block is generated. For example, when generating the first-block $A_n$, information indicating the rate of the communication unit 11 connected to the internet 1 among the communication units 11 of the vehicles 10 may be included in the first-block $A_n$. The first hash value $HA_n$ is then generated also based on the information included in the previous first-block $A_{n-1}$ indicating the rate of the communication unit 11 connected to the internet 1, so that a more reliable hash value $HA_n$ can be generated.

The second-block $B_n$ includes a second-information $IB_n$, a third hash value $HC_n$ generated from the content of the previous second-block $B_{n-1}$, and a fourth hash value $HD_n$ generated from the content of the previous first-block $A_{n-1}$ of the first-block $A_n$ corresponding to the second-block $B_n$. However, in the second-blocks $B_1, B_2, B_3$ . . . constituting the second block chain 22, the first second-block $B_1$ does not include the third hash value $HC_1$ and the fourth hash value $HD_1$ because the previous block does not exist.

The information generation unit 12 generates the information included in the second-block $B_n$, that is, the second-information $IB_n$, the third hash value $HC_n$, and the fourth hash value $HD_n$. The second-information $IB_n$, i.e., the information about the area here, is registered in the vehicle 10, for example, when the vehicle is sold, and the registered information is acquired. The third hash value $HC_c$ is generated, for example, by encrypting the content of the previous second-block $B_{n-1}$ using a hashing function. The fourth hash value $HD_n$ is also generated, for example, by encrypting the content of the previous first-block $A_{n-1}$ of the first-block $A_n$ corresponding to the second-block $B_n$ using a hashing function.

As described above, in the second embodiment, the n-th first-block $A_n$ of the first block chain 21 and the n-th second-block $B_n$ of the second block chain 22 are associated with or correspond to each other. Therefore, the third hash value $HC_n$ included in the n-th second-block $B_n$ is the same as the second hash value $HB_n$ included in the n-th first-block $A_n$, and the fourth hash value $HD_n$ included in the n-th second-block $B_n$ is the same as the first hash value $HA_n$ included in the n-th first-block $A_n$.

Here, the second-block $B_n$ may further include other information, such as a time stamp when the block is generated. For example, when generating the second-block $B_n$, information indicating the rate of the communication unit 11 connected to the internet 1 among the communication units 11 of the vehicles 10 may be included in the second-block $B_n$. The third hash value $HC_n$ is then generated also based on the information included in the previous second-block $B_{n-1}$ indicating the rate of the communication unit 11 connected to the internet 1, so that a more reliable hash value $HC_n$ can be generated.

Here, it is preferred that the plurality of first-information $IA_n$ managed by the first block chain 21 differ at least in part. Likewise, the plurality of second-information $IB_n$ managed by the second block chain 22 preferably differ at least in part. For example, regarding information about the vehicle type, it is preferable that the vehicle type of at least part of the vehicles 10 differ from others, and, regarding information about the area, it is preferable that the area in which at least part of the vehicles 10 is registered differ from others.

The recordation unit 13 records the data generated by the information generation unit 12 in the storage unit 14. Here, when the information is generated by the information generation unit 12, if the rate of the communication unit 11 connected to the internet 1 among the communication units 11 of the vehicles 10 is less than 50%, the recordation unit 13 does not record the generated information in the storage unit 14.

Here, the authenticity of the first-information $IA_n$ stored in the n-th first-block $A_n$ can be confirmed as follows. That is, confirm whether the hash value generated based on the content of the first-block $A_n$ including the first-information $IA_n$ matches the first hash value $HA_{n+1}$ included in the (n+1)-th first-block $A_{n+1}$, and confirm whether the hash value generated based on the content of the second-block $B_n$ corresponding to the first-block $A_n$ matches the second hash value $HB_{n+1}$ included in the (n+1)-th first-block $A_{n+1}$. Alternatively, confirm whether the hash value generated based on the content of the first-block $A_n$ including first-information $IA_n$ matches the first hash value $HA_{n+1}$ included in the (n+1)-th first-block $A_{n+1}$, and confirm whether the hash value generated based on the content of the first-block $A_n$ matches the fourth hash value $HD_{n+1}$ included in the (n+1)-th second-block $B_{n+1}$ corresponding to the (n+1)-th first-block $A_{n+1}$. If two hash values are matched, the first-information $IA_n$ stored in the first-block $A_n$ is determined to be correct.

Similarly, the authenticity of the second-information $IB_n$ stored in the n-th second-block $B_n$ can be confirmed as follows. That is, confirm whether the hash value generated based on the content of the second-block $B_n$ including the second-information $IB_n$ matches the third hash value $HC_{n+1}$ included in the (n+1)-th second-block $B_{n+1}$, and confirm whether the hash value generated based on the content of the first-block $A_n$ corresponding to the second-block $B_n$ matches the fourth hash value $HD_{n+1}$ included in the (n+1)-th second-block $B_{n+1}$. Alternatively, confirm whether the hash value generated based on the content of the second-block $B_n$ including second-information $IB_n$ matches the third hash value $HC_{n+1}$ included in the (n+1)-th second-block $B_{n+1}$, and confirm whether the hash value generated based on the content of the second-block $B_n$ matches the second hash value $HB_{n+1}$ included in the (n+1)-th first-block $A_{n+1}$ corresponding to the (n+1)-th second-block $B_{n+1}$. If two hash values are matched, the second-information $IB_n$ stored in the second-block $B_n$ is determined to be correct.

As described above, the vehicle information management system 100 according to the second embodiment is configured to manage information by using the first block chain 21 and the second block chain 22. The first-block $A_n$ constituting the first block chain 21 includes the first-information $IA_n$, the first hash value $HA_n$ generated from the content of the previous first-block $A_{n-1}$, and the second hash value $HB_n$ generated from the content of the previous second-block $B_{n-1}$ of the corresponding second-block $B_n$; and the second-block $B_n$ constituting the second block chain 22 includes the second-information $IB_n$, the third hash value $HC_n$ generated from the content of the previous second-block $B_{n-1}$, and the fourth hash value $HD_n$ generated from the content of the previous first-block $A_{n-1}$ of the corresponding first-block $A_n$. That is, since the first-block $A_n$ constituting the first block chain 21 is configured to include, not only the first hash value $HA_n$ generated from the content of the previous first-block $A_{n-1}$, but also the second hash value $HB_n$ generated from the content of the previous second-block $B_{n-1}$ of the second-block $B_n$ constituting the second block chain 22 other than the first block chain 21, as compared with a configuration including only one hash value, it is possible to more effectively suppress unauthorized rewriting of information.

Similarly, since the second-block $B_n$ constituting the second block chain 22 is configured to include, not only the third hash value $HC_n$ generated from the content of the previous second-block $B_{n-1}$, but also the fourth hash value $HD_n$ generated from the content of the previous first-block $A_{n-1}$ of the first-block $A_n$ constituting the first block chain 21 other than the second block chain 22, as compared with a configuration including only one hash value, it is possible to more effectively suppress unauthorized rewriting of information.

In order for a third party to illegally rewrite the first-information $IA_n$ recorded in the storage unit 14, not only the content of all first-blocks $A_1, A_2, A_3 \ldots$ that make up the first block chain 21 but also the content of all second-blocks $B_1, B_2, B_3 \ldots$ that make up the second block chain 22 must be rewritten. Alternatively, at least the content of all first-blocks $A_n, A_{n+1}, A_{n+2} \ldots$ after the first-block $A_n$ including the first-information $IA_n$ and the content of all second-blocks $B_n, B_{n+1}, B_{n+2} \ldots$ after the second-block $B_n$ corresponding to the first-block $A_n$ must be rewritten. Therefore, it is virtually impossible. Similarly, in order to illegally rewrite the second-information $IB_n$, not only the content of all second-blocks $B_1, B_2, B_3 \ldots$ that make up the second block chain 22 but also the content of all first-blocks $A_1, A_2, A_3 \ldots$ that make up the first block chain 21 must be rewritten. Alternatively, at least the content of all second-blocks $B_n, B_{n+1}, B_{n+2} \ldots$ after the second-block $B_n$ including the second-information $IB_n$ and the content of all first-blocks $A_n, A_{n+1}, A_{n+2} \ldots$ after the first-block $A_n$ corresponding to the second-block $B_n$ must be rewritten. Therefore, it is virtually impossible.

The above embodiment can be combined as desired with one or more of the above modifications. The modifications can also be combined with one another.

According to the present invention, it becomes possible to sufficiently suppress unauthorized rewriting of information.

Above, while the present invention has been described with reference to the preferred embodiments thereof, it will be understood, by those skilled in the art, that various changes and modifications may be made thereto without departing from the scope of the appended claims.

What is claimed is:

1. An information management system, in which each of a plurality of vehicles is configured to record information using a block chain, each of the plurality of vehicles comprising:
   a communication unit including an antenna and configured to be connectable to an internet through the antenna;
   a storage unit configured to store the information in a form of the block chain; and a processor and a memory coupled to the processor, wherein
the processor is configured to perform:
recording the information in the storage unit, wherein the recording includes recording a transaction executed between the plurality of vehicles in the storage unit as the information on condition that the communication unit is connected to the internet, wherein
the recording includes recording the transaction in the storage unit in a block unit together with:
information about a rate of the communication unit connected to the internet among communication units of the plurality of vehicles at a time when the transaction is executed; and
a hash value.

2. The information management system according to claim 1, wherein the processor is configured to perform:
generating the hash value based on content of a previous block in the block chain.

3. The information management system according to claim 1, wherein the processor is configured to perform:
the recording including recording the transaction in the storage unit as a completed transaction on condition that the rate of the communication unit connected to the internet among the communication units of the plurality of vehicles at a time when execution of the transaction is requested between the plurality of vehicles is higher than a predetermined rate.

4. The information management system according to claim 3, wherein
the communication unit is configured to acquire the rate of the communication unit connected to the internet among the communication units of the plurality of vehicles at a predetermined time interval through the antenna, wherein
the processor is configured to perform:
when the rate of the communication unit connected to the internet is equal to or lower than the predetermined rate and the transaction is not executed, retaining the transaction as an incompleted transaction; and
the recording including recording the incompleted transaction in the storage unit as the completed transaction on condition that the rate of the communication unit connected to the internet acquired by the communication unit exceeds the predetermined rate.

5. The information management system according to claim 4, wherein the processor is configured to perform:
the recording including recording the incompleted transaction retained by each of the plurality of vehicles and the hash value in the block unit in the storage unit.

6. The information management system according to claim 4, further comprising:
a display unit configured to display information about the transaction, wherein
the display unit is configured to display information assuming that the transaction has been completed even when the transaction instructed to be executed by a user becomes the incompleted transaction.

7. The information management system according to claim 3, wherein
the predetermined rate is set in accordance with the rate of the communication unit connected to the internet within a predetermined time period or in a predetermined time zone.

8. The information management system according to claim 1, wherein the processor is configured to perform:
the recording including recording a plurality of first blocks constituting a first block chain, and a plurality of second blocks constituting a second block chain in the storage unit, wherein
each of the first blocks constituting the first block chain corresponds to one of the second blocks constituting the second block chain, wherein
a first block corresponds to a second block, and includes:
first information;
a first hash value generated based on content of a previous block of the first block in the first block chain; and
a second hash value generated based on content of a previous block of the second block in the second block chain, wherein the second block includes:
second information;
a third hash value generated based on the content of the previous block of the second block in the second block chain; and
a fourth hash value generated based on the content of the previous block of the first block in the first block chain.

9. The information management system according to claim 8, wherein
one of the first information and the second information is information about a type of each of the plurality of vehicles, and the other is information about an area in which each of the plurality of vehicles is registered.

10. The information management system according to claim 8, wherein
the first information and the second information differ at least in part.

11. An information management system, in which each of a plurality of vehicles is configured to record information using a block chain, each of the plurality of vehicles comprising:
a communication unit including an antenna and configured to be connectable to an internet through the antenna;
a storage unit configured to store the information in a form of the block chain; and
a processor and a memory coupled to the processor, wherein
the processor is configured to perform:
recording the information in the storage unit, wherein the recording includes recording a transaction executed between the plurality of vehicles in the storage unit as the information on condition that the communication unit is connected to the internet, wherein
the recording including recording the transaction in the storage unit as a completed transaction on condition that the rate of the communication unit connected to the internet among the communication units of the plurality of vehicles at a time when execution of the transaction is requested between the plurality of vehicles is higher than a predetermined rate.

12. The information management system according to claim 11, wherein the processor is configured to perform:
when the rate of the communication unit connected to the internet is equal to or lower than the predetermined rate, retaining the transaction as an incompleted transaction; and
the recording including recording the incompleted transaction in the storage unit as the completed transaction on condition that the rate of the communication unit connected to the internet acquired by the communication unit exceeds the predetermined rate.

13. The information management system according to claim 12, wherein the processor is configured to perform:
the recording including recording the incompleted transaction retained by each of the plurality of vehicles and a hash value in a block unit in the storage unit.

14. The information management system according to claim 12, further comprising:
a display unit configured to display information on the transaction.

15. The information management system according to claim 14, wherein
the display unit is configured to display the information on the transaction even when the transaction comprises an incompleted transaction.

16. The information management system according to claim 11, wherein
the communication unit is configured to acquire the rate of the communication unit connected to the internet among the communication units of the plurality of vehicles at a predetermined time interval through the antenna.

17. The information management system according to claim 11, wherein
the communication unit is configured to calculate an average value of the rate of the communication unit connected to the internet within a predetermined time, and set the predetermined rate as the average value.

18. The information management system according to claim 11, wherein
the recording includes recording the transaction in the storage unit in a block unit together with:
information about the rate of the communication unit connected to the internet at a time when the transaction is executed; and
a hash value.

19. An information management system, in which each of a plurality of vehicles is configured to record information using a block chain, each of the plurality of vehicles comprising:
a communication unit including an antenna and configured to be connectable to an internet through the antenna;
a storage unit configured to store the information in a form of the block chain; and
a processor and a memory coupled to the processor, wherein
when a transaction is executed between vehicles of the plurality, the processor is configured to:
record a block unit in the storage unit that includes the transaction, and information about a rate of the communication unit connected to the internet at a time when the transaction is executed, on condition that the communication unit is connected to the internet.

20. The information management system according to claim 19, wherein the processor is configured to:
record, in the block unit, the transaction as a completed transaction on condition that the rate of the communication unit connected to the internet at a time when execution of the transaction is requested is higher than a predetermined rate.

* * * * *